United States Patent
Kuroda et al.

Patent Number: 5,413,146
Date of Patent: May 9, 1995

[54] HOSE WITH RELEASABLE FLOAT FOR LEAK DETECTION

[75] Inventors: Masuo Kuroda, Tokyo; Fumihiko Yazaki, Hiratsuka; Masashi Wakabayashi, Hiratsuka; Naoyuki Ohoka, Hiratsuka, all of Japan

[73] Assignee: The Yokohama Rubber Co., Ltd., Tokyo, Japan

[21] Appl. No.: 256,152

[22] PCT Filed: Nov. 9, 1993

[86] PCT No.: PCT/JP93/01628

§ 371 Date: Jul. 8, 1994

§ 102(e) Date: Jul. 8, 1994

[87] PCT Pub. No.: WO94/11665

PCT Pub. Date: May 26, 1994

[30] Foreign Application Priority Data

Nov. 9, 1992 [JP] Japan .................. 4-298633

[51] Int. Cl.6 .................................. F16L 55/00
[52] U.S. Cl. .................................. 138/104; 138/103; 138/109; 138/125; 138/137; 116/264
[58] Field of Search .............. 138/103, 104, 109, 177, 138/178, 137, 124, 125, 126; 116/200, 209, 210, 208, 264; 73/40, 49.1, 49.5; 405/157, 171

[56] References Cited

U.S. PATENT DOCUMENTS

| | | | |
|---|---|---|---|
| 3,105,459 | 10/1963 | Conn | 116/209 |
| 3,489,182 | 1/1970 | Cameron | 138/103 |
| 3,972,223 | 8/1976 | Torghele | 138/104 |
| 4,067,199 | 1/1978 | Jegousse | 405/171 |
| 4,127,007 | 11/1978 | Mathieu et al. | 405/171 |
| 4,153,079 | 5/1979 | Ambrose | 138/104 |
| 4,191,494 | 3/1980 | Nakamura et al. | 405/171 |
| 4,259,553 | 3/1981 | Tanaka | 200/81 |
| 4,465,105 | 8/1984 | Slater | 138/104 |
| 4,509,558 | 4/1985 | Slater | 138/104 |
| 4,563,108 | 1/1986 | Ayers | 405/171 |
| 5,078,181 | 1/1992 | Schneider | 138/103 |
| 5,244,016 | 9/1993 | Kuroda et al. | 138/178 |

FOREIGN PATENT DOCUMENTS

| | | |
|---|---|---|
| 55-33946 | 3/1980 | Japan . |
| 57-25756 | 5/1982 | Japan . |
| 57-86689 | 5/1982 | Japan . |
| 58-174784 | 10/1983 | Japan . |
| 2027838 | 2/1980 | United Kingdom . |

*Primary Examiner*—James E. Bryant, III
*Attorney, Agent, or Firm*—Finnegan, Henderson, Farabow, Garrett & Dunner

[57] ABSTRACT

An object of the present invention is to provide a hose of low cost, which can be installed very easily, which remains reliable over a long period of time, and in which damage to the inner construction can be easily discovered. An auxiliary pressure cord layer 7 is capable of being deformed by the pressure of a fluid in a chamber 9. A float 10 attached to a hose 1 with a mooring line is also attached to a hose body 2 through a connecting member, and when an amount of deformation of the auxiliary pressure cord layer 7 has reached a predetermined value, the connecting member is fractured and the float 10 is separated from the hose 1.

9 Claims, 8 Drawing Sheets

HOSE WITH RELEASABLE FLOAT FOR LEAK DETECTION

TECHNICAL FIELD

The present invention relates to a hose for transporting a fluid such as oil or the like in the sea or in the water, and more particularly relates to a hose in which damage to a pressure cord layer can be easily found even when it is used in the sea or in the water.

BACKGROUND ART

Conventionally, a hose line composed of a plurality of hoses connected end-to-end is used for loading a tanker with oil or the like, or unloading the tanker, because the tanker is generally moored offshore.

In the case where a hose used for the hose line is damaged in an emergency, oil leaks out from the hose line, and serious environmental pollution results. Therefore, the hose used for the hose line has a double construction in which an auxiliary pressure cord layer is provided outside the main pressure cord layer which provides a chamber into which fluid that has leaked through the main pressure layer flows. In the case where the main pressure cord layer is damaged, the fluid that leaks out from the main pressure cord layer is retained in the chamber enclosed by the auxiliary pressure cord layer. Accordingly, in the prior art, if the outer appearance of the hose is visually inspected to be changed, the damage in the hose is determined.

In this connection, when the hose is used in the sea, it is impossible to determine the occurrence of damage visually. Therefore, a detector is provided in the hose, by which a change in pressure of the fluid that has leaked out from the main pressure cord layer into the chamber is detected, and a signal sent from the detector is received by a receiver installed on the sea or ground, so that the occurrence of damage of the main pressure cord layer is determined.

When the hose is used in the sea as described above, it is necessary to provide auxiliary apparatus such as a detector and receiver. Therefore, the installation of the hose is complicated, and the cost of the hose is greatly increased.

Furthermore, the detector tends to be damaged and malfunctions tend to occur, so that the aforementioned detection system lacks reliability when it is used over a long period of time.

DISCLOSURE OF THE INVENTION

The present invention has been made in view of the foregoing problems of the prior art. It is therefore an object of the present invention to provide a hose characterized in that: installation of the hose is very easy; the cost is low; the reliability is high even if it is used over a long period of time; and damage in the hose can be easily detected.

In order to accomplish the above objects, the present invention provides a hose comprising: a main pressure cord layer for retaining and circulating a fluid; an auxiliary pressure cord layer sheathing the main pressure cord layer; and a chamber for retaining the fluid leaking from the main pressure cord layer, said chamber being formed between the main pressure cord layer and the auxiliary pressure cord layer, wherein the auxiliary pressure cord layer is capable of being deformed by the pressure of the fluid retained in the chamber, the hose further comprising a float moored on the hose, the float being connected to the hose through a connection member, wherein the connection member is fractured and the float is released from the hose when an amount of deformation of the auxiliary pressure cord layer has increased to a predetermined value.

The present invention is constructed in the manner described above when the main pressure cord layer is damaged and the transported fluid flows into the chamber, the auxiliary pressure cord layer is deformed by the fluid pressure. When an amount of deformation of the auxiliary pressure cord layer is increased to a predetermined value, the connecting member is fractured, so that the float is released from the hose and floats in the sea, Since the float is moored at the hose, it does not flow away but floats around the hose, the main pressure cord of which has been damaged. Consequently, when the floating float is discovered, it is possible to find the hose, the main pressure cord layer of which has been damaged.

According to a preferred embodiment of the present invention, an annular float mount is integrally attached to the hose, and a plurality of floats divided into pieces in the circumferential direction are disposed adjacent to the annular float mount. Also, each float is moored at the hose with a mooring rope accommodated in the float mount.

As an embodiment of the present invention, the auxiliary pressure cord layer is composed in such a manner that it is mainly deformed in the longitudinal direction of the hose by the action of pressure of the fluid retained in the chamber, a pair of float mounts are integrally attached to the hose at an interval in the longitudinal direction, the floats are respectively disposed on the hose end sides of the float mounts, these floats are connected by wires penetrating through the float mounts, and the floats are released from the hose when an amount of longitudinal deformation of the auxiliary pressure cord layer has increased to a predetermined value. In this case, it is preferable that the floats are connected to the wires through fuse washers which are fractured when a predetermined stress is applied.

According to another embodiment of the present invention, the auxiliary pressure cord layer is composed in such a manner that it is mainly expanded and deformed in the radial direction of the hose by the action of pressure retained in the chamber, the float mount is integrally attached to the hose, the float moored at and disposed adjacent to the float mount is fastened and fixed to the hose by an annular float fastening fixture, and the float is released from the hose when an amount of expanding deformation in the radial direction of the auxiliary pressure cord layer has increased to a predetermined value. In this case, the annular float fixture is preferably fastened and fixed to the hose through a bolt and nut, with a fuse washer which is fractured when a predetermined stress is applied.

According to still another embodiment of the present invention, the auxiliary pressure cord layer is composed in such a manner that it is mainly deformed in a twisting direction by the action of pressure of the fluid retained in the chamber, a pair of float mounts are integrally attached to the hose at an interval in the longitudinal direction, floats are disposed between these float mounts, and the floats are respectively connected to the float mounts through a fuse bolt which is fractured when a predetermined stress is applied. In this case, it is preferable that the float is annular and divided into a plurality of pieces in the circumferential direction, and the pieces of the divided float are alternately connected to one or the other of the pair of float mounts by the fuse bolts.

BEST MODE FOR CARRYING OUT THE INVENTION

With reference to the accompanying drawings, an embodiment of the present invention will be explained as follows.

Figure 1:
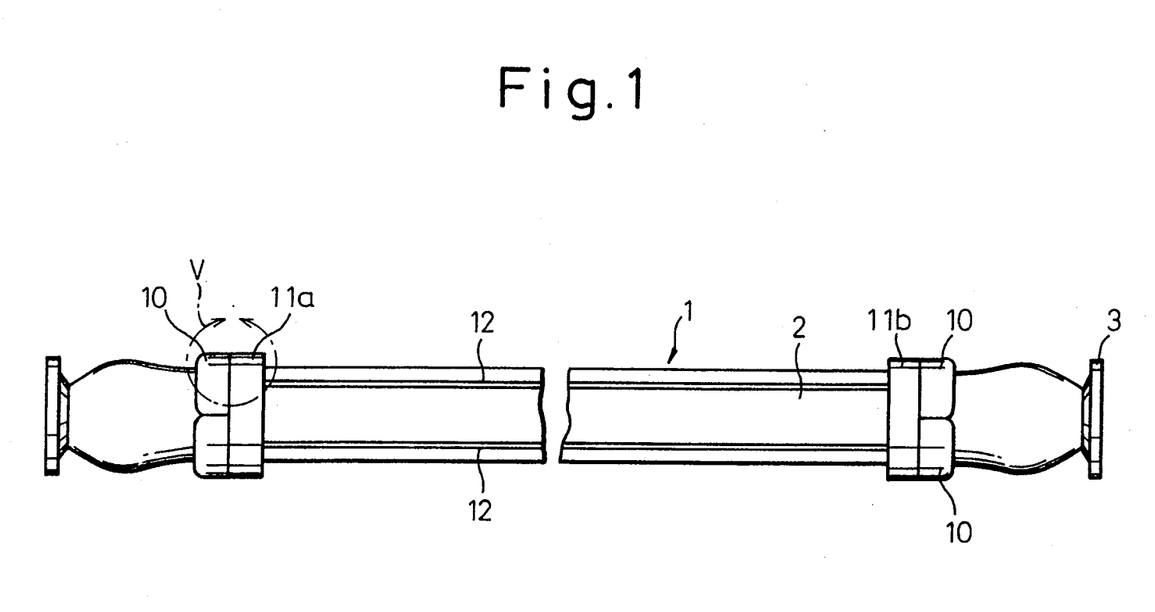
FIG. 1 is a front view showing the first embodiment of the hose of the present invention.

FIG. 1 shows the first embodiment of the present invention. The hose 1 is approximately 9 m to 12 m long. Although not shown in the drawing, a large number of hoses 1 are connected in use. Each hose 1 includes: a hose body 2 capable of being deformed when the inner construction is damaged; flanges 3 for connecting the hoses 1, the flanges 3 being provided on both sides of the hose body 2; and floats 10 capable of being released from the hose 1 when the inner construction of the hose 1 is damaged, the floats 10 being provided on the outer circumferences of both ends of the hose body 2.

Figure 2:
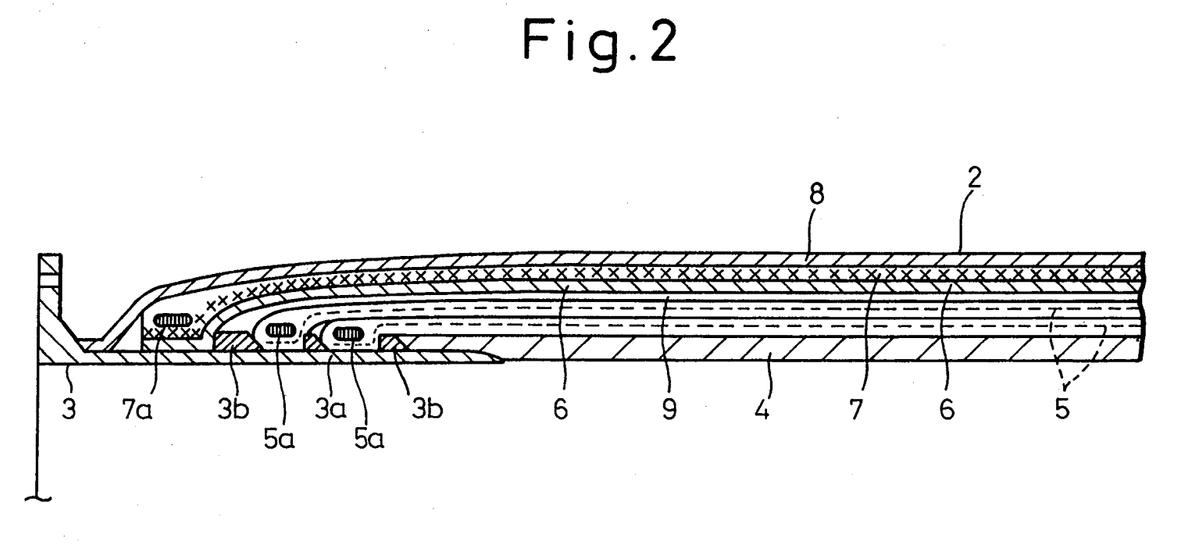
FIG. 2 is a sectional view of an end portion of the hose showing the construction of the hose illustrated in FIG. 1.

As illustrated in the sectional view of FIG. 2, the hose body 2 is composed of: a rubber tube layer 4 made of acrylonitrile-butadiene rubber (ANBR) which is provided inside most; a main pressure cord layer 5 for holding the fluid, such as oil, transported in the hose 1, wherein the main pressure cord layer 5 covers the rubber tube layer 4; and an auxiliary pressure cord layer 7 capable of holding a fluid which has leaked from the rubber tube layer 4 and the main pressure cord layer 5, the auxiliary pressure cord layer 7 being provided outside the main pressure cord layer 5 through an intermediate rubber layer 6 made of NBR or the like. On the auxiliary pressure cord layer 7, there is provided a cover rubber layer 8 made of styrene-butadiene rubber (SBR) so that the hose body 2 is covered.

Between the main pressure cord layer 5 and the intermediate rubber layer 6 adhered onto the auxiliary pressure cord layer 7, there is provided a chamber 9 having a liquid-tight property, and a fluid that has leaked out from the rubber tube layer 4 and the main pressure cord layer 5 flows into and remains in the chamber 8. This chamber 9 is a space formed between the main pressure cord layer 5 and the intermediate rubber layer 6. Alternatively, the main pressure cord layer 5 and the intermediate rubber layer 6 are adhered to each other, and they are separated by the pressure of a fluid that has leaked out from the rubber tube layer 4 and the main pressure cord layer 5, so that a space can be formed when the leaking fluid flows between the main pressure cord layer 5 and the intermediate rubber layer 6 and the two layers are separated.

Figure 3:
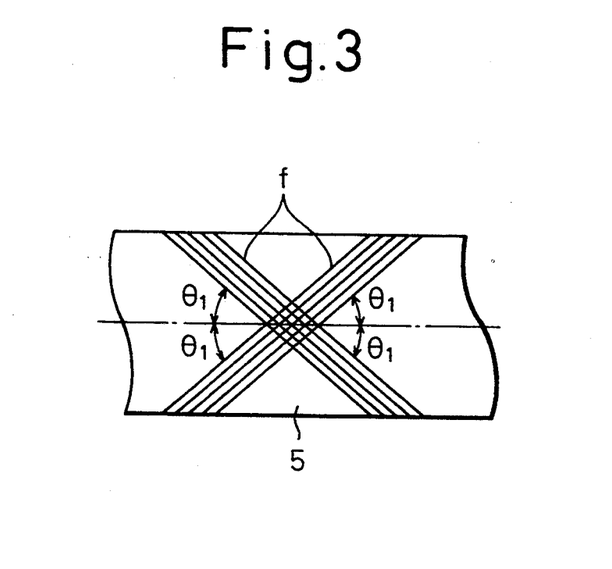
FIG. 3 is a schematic illustration for explaining the orientation of cords of the main pressure cord layer shown in FIG. 2.

As shown in FIG. 3, the main pressure cord layer 5 is composed of cord plies each formed by helically winding cords f, produced by twisting nylon strands, polyester strands, rayon strands, aromatic polyamide strands or steel wires, and coating each ply of the cords f with SBR or the like. The cord plies of the cords f include one or more first cord ply each composed of the cords f extending in one helical direction at a helix angle $\theta_1$, and a second cord ply each composed of the cords f in the opposite helical direction at the same helix angle $\theta_1$, but the number of cords in the first cord ply is equal to that in the second cord ply.

The helix angle $\theta_1$ is in a range defined by $30° < \theta_1 < 60°$, more preferably, in a range defined by $35° < \theta_1 \leqq 55°$. The helix angle $\theta$ below 30° deteriorates the flexibility of hose body 2 and the helix angle $\theta_1$ greater than 60° makes the hose body 2 excessively flexible, which makes the hose 1 difficult to handle. A helix angle $\theta_1$ greater than 35° and not greater than 55° enables the cord plies to impart flexibility to the hose body 2 and efficiently enhances the pressure-withstanding strength of the hose body 2. Unlike the auxiliary pressure cord layer 7 described later, the number of layers (the number of plies) in the main pressure cord layer 5 is larger than that in the auxiliary pressure cord layer 7 so that the main pressure cord layer 5 can not be easily deformed by the pressure of fluid in the hose.

Figure 4:
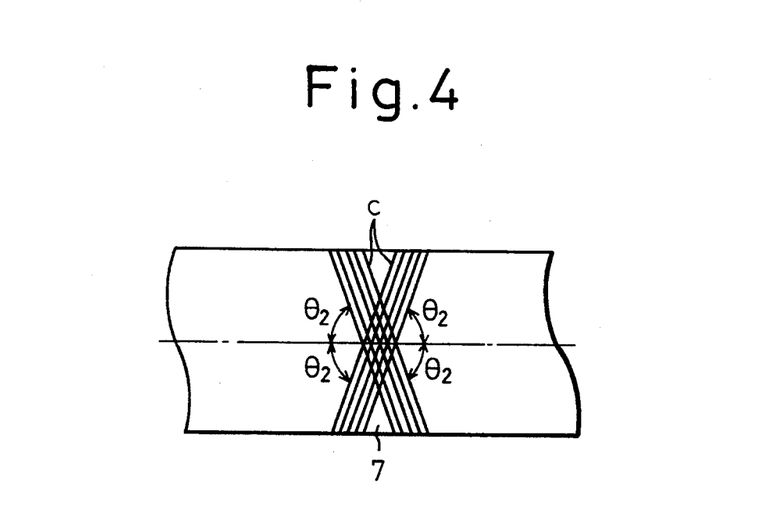
FIG. 4 is a schematic illustration for explaining the orientation of cords of the auxiliary pressure cord layer shown in FIG. 2.

The auxiliary pressure cord layer 7 is constructed in such a manner that it is extended in the longitudinal direction of the hose body 2 by the pressure of fluid when the fluid has leaked out from the rubber tube layer 4 and the main pressure cord layer 5. As shown in FIG. 4, the auxiliary pressure cord layer 7 is composed of cord plies each formed by helically winding cords c, produced by twisting nylon strands, polyester strands, rayon strands, aromatic polyamide strands or steel wires, and coating each cord ply of the cords c with SBR or the like. The cord plies of the cords c include one or more first cord ply each composed of the cords c extending in one helical direction at a helix angle $\theta_2$, and second cord plies each composed of the cords c in the opposite helical direction at the same helix angle $\theta_2$.

The number cords in the first cord ply is equal to that in the second cord ply.

The helix angle $\theta_2$ is in a range of $54° < \theta_2 < 90°$ with respect to the longitudinal direction of the hose body 2. In the case where $\theta_2$ is not more than 54°, a sufficient elongation can not be expected with respect to the longitudinal direction of the hose body 2. It is preferable that the angle $\theta_2$ is in a range of $65° < 80°$. When the helix angle $\theta_2$ of the cord c of the auxiliary pressure cord layer 7 is relatively large, the auxiliary pressure cord layer 7 can be easily elongated in the longitudinal direction by the pressure of fluid when the fluid has leaked out from the rubber tube layer 4 and the main pressure cord layer 5.

It is preferable that the chamber 9 is packed with a buffering member such as a sponge having open voids or closed voids. When a pressure buffering layer, composed of the buffering member described above, is in the chamber 9, the pressure of leaking fluid can be absorbed when the rubber tube layer 4 and the main pressure cord layer 5 have been damaged, so that a shock applied to the intermediate rubber layer 6 can be reduced, and the auxiliary pressure cord layer 7 is not damaged.

A ring portion 3b for attaching the hose body 2 is integrally provided on an outer circumferential surface of the cylinder portion 3a of the flange 3. The hose body 2 and the flange 3 are connected and joined in the following manner:

An end portion of the hose body 2 is fixed to the ring portion 3b by fastening wires 5a, 7a provided at the ends of the main pressure cord layer 5 and the auxiliary pressure cord layer 7, and the end portions of the layers composing the hose body 2 are adhered to each other.

Figure 5:
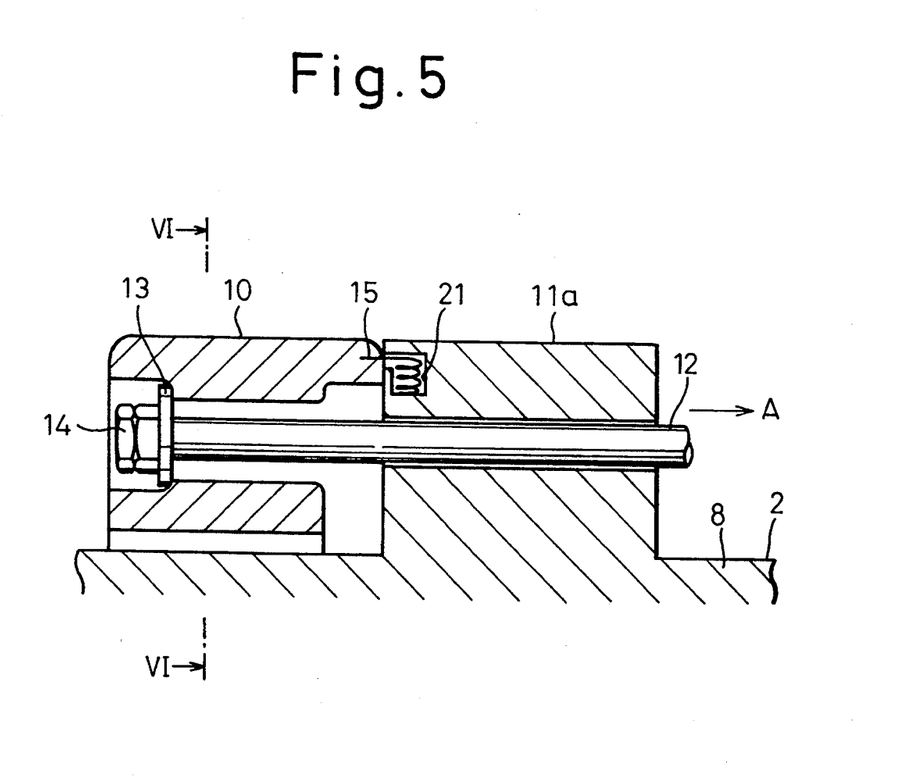
FIG. 5 is an enlarged sectional view of the V portion shown in FIG. 1.
Figure 6:
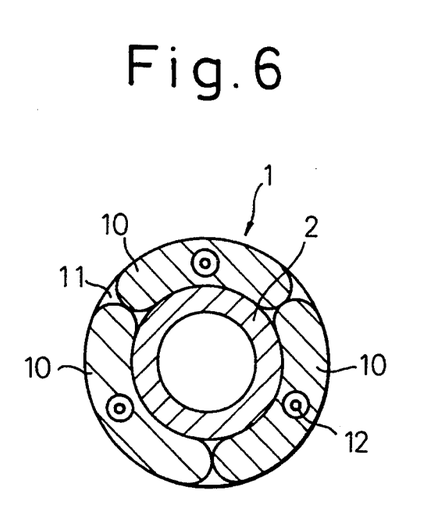
FIG. 6 is a sectional view showing a mounting condition of a float divided into three pieces.

As illustrated in FIGS. 1 and 5, the floats 10 are attached onto the outer sides of annular float mounts 11a, 11b integrally formed on the outer circumferences of both ends of the covering rubber layer 8. In this case, the floats 10 are attached through the following connecting members: a wire 12 extending between both float mounts 11a and 11b, both ends of the wire 12 being provided with male screw portions; a fuse washer 13 inserted into the male screw portion; and a nut screwed to the male screw portion. In order to prevent the floats 10 from flowing away from the hose body 2 in the case where the fuse washer 13 has been fractured, the floats 10 are moored at the hose body 2 by mooring ropes 15 accommodated in cutout portions 21 of the float mounts 11a, 11b. This mooring rope 15 is composed of a rope made of fiber or steel wire, the length of which is not less than the depth of water in which the hose is used. It is necessary that the specific gravity of the float 10 is lower than that of fluid such as sea water or water so that the float 10 can rise to the surface, and the material of the float 10 is not particularly limited. In order to enable the float to be easily identified when it has risen onto the surface of the sea or water, it is preferable that the color of the float 10 is, for example, orange. One float 10 may be attached to either of the float mounts 11a, 11b, however, it is preferable that a plurality of floats 10 are attached to both float mounts 11a, 11b. Especially, as illustrated in FIG. 6, it is preferable that the float 10 is formed to be annular and divided into three or four pieces by the same angle and respectively attached to the float mount 11a or 11b. Of course, a plurality of pairs of connecting members such as the wires 12, fuse washers 13 and nuts 14 are provided in accordance with the number of the floats 10. When a plurality of floats 10 are provided as described above, even when either of the fuse washers 14 is not fractured, or even when either of the fuse washers 14 is hooked so that the float 10 can not be separated from the hose body 2, other floats 10 are separated and rise on the surface. In this way, some of the floats 10 attached to the hose body 2 can rise to the surface.

Next, the action of the hose of the embodiment described above will be explained as follows.

When the rubber tube layer 4 and the main pressure cord layer 5 of the hose body 2 are damaged and the fluid leaks out, the leaking fluid flows into the chamber 9 and stays there. Then, by the action of the fluid, the auxiliary pressure cord layer 7 is inflated. Therefore, the cords c of the cord ply being inclined with respect to the longitudinal direction of the hose body 2 by the angle $\theta_2$ are moved so that the inclination angle $\theta_2$ can be reduced. In this embodiment, the helix angle $\theta_2$ of the cords c of the auxiliary pressure cord layer 7 is relatively large. Therefore, a force is applied in a direction in which the angle $\theta_2$ is reduced. Accordingly, the auxiliary pressure cord layer 7 is elongated in the longitudinal direction of the hose body 2, and the cover rubber layer 8 on the auxiliary pressure cord layer 7 is also elongated in the same manner.

Together with the elongation of the cover rubber layer 8 in the longitudinal direction, the float mounts 11a, 11b are moved at both ends of the hose body 2. Therefore, the wire 12 is pulled in the direction of arrow A shown in FIG. 5, so that a load is impressed upon the fuse washer 13. When the auxiliary pressure cord 7 is further elongated and the length is increased to a predetermined value (a predetermined amount of deformation), the fuse washers 13 are fractured, and the floats 10 are separated from the float mounts 11a, 11b, that is, the floats 10 are separated from the hose body 2 and rise to the surface. Since the raised floats 10 are moored by the mooring ropes 15, they do not move away from the hose body 2, so that the raised floats 10 are floating near the hose 1, the inner construction of which has been damaged. Consequently, when these floats 10 are discovered, damage to the inner construction of the hose installed in the sea or water can be easily detected. In this connection, in the first embodiment, it is possible to provide an appropriate amount of play to the wire 12 so that a certain amount of elongation can be allowed to the hose body 2 until the fuse washer 13 is fractured while consideration is given to a relation between the pressure of fluid that has leaked out to the chamber 9 and the elongation (deformation) of the hose body 2.

In the first embodiment described above, when the fuse washer 13 is fractured, the float 10 is separated. However, instead of fracturing the fuse washer 13, it is possible to fracture both end portions of the wire 12 of the connecting member.

Figure 7:
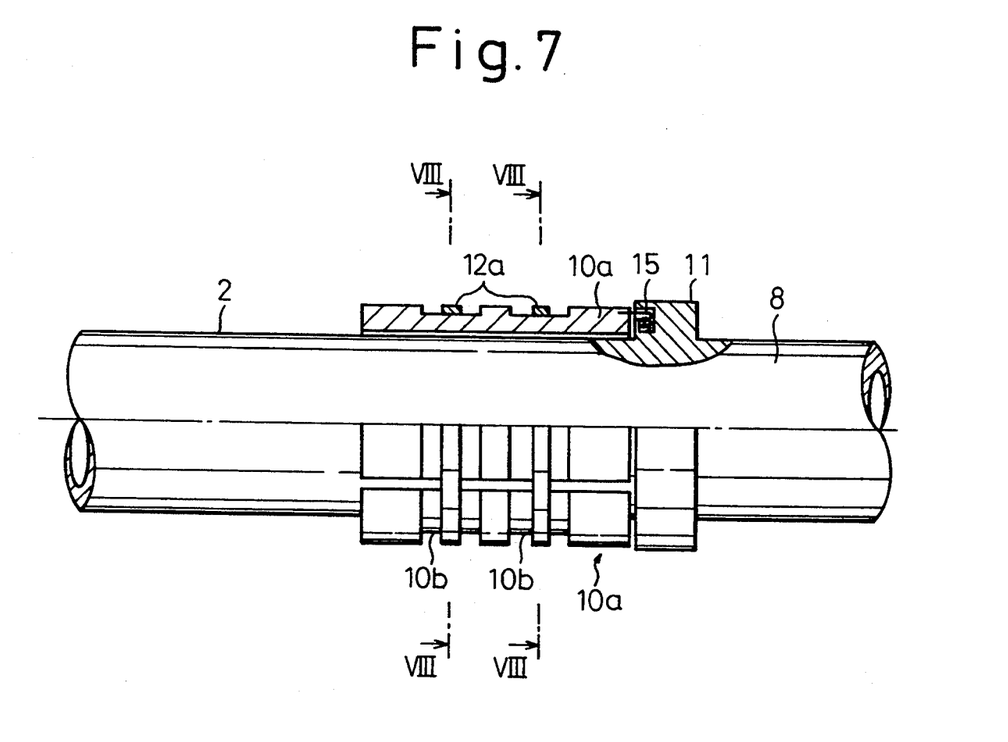
FIG. 7 is a partially sectional front view showing a portion of the hose of the second embodiment of the present invention.
Figure 8:
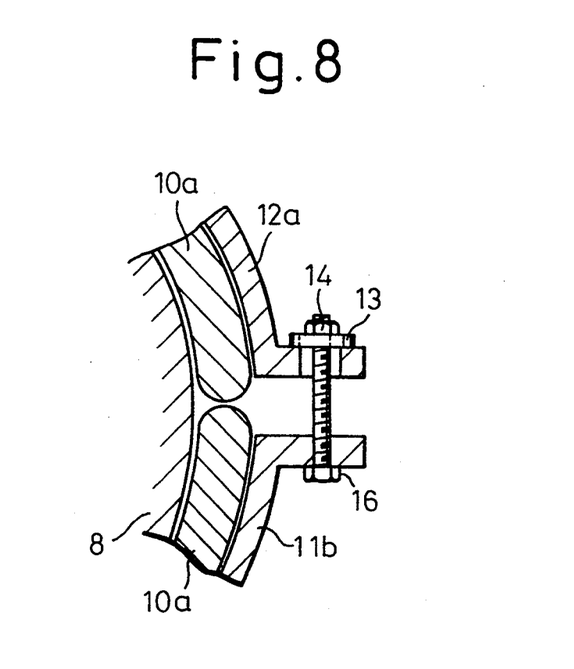
FIG. 8 is a schematic illustration showing a condition in which the float is mounted in the second embodiment shown in FIG. 7.

FIGS. 7 and 8 are views showing the second embodiment of the present invention. Only the points different from the first embodiment will be explained as follows. In this second embodiment, the hose body 2 is expanded and deformed in the radial direction when the rubber tube layer 4 and the main pressure cord layer 5 have been damaged and the fluid has flown into the chamber 9. In the hose body 2 of the second embodiment, the helix angle $\theta_2$ of the cords c of the cord plies in the auxiliary pressure cord layer 7 is determined to be in a range of $20° \leq \theta_2 \leq 50°$ with respect to the longitudinal direction of the hose body 2. The reason is as follows.

When the angle $\theta_2$ exceeds 50°, the hose 2 can not be sufficiently expanded in the radial direction. On the other hand, when the angle $\theta_2$ is smaller than 20°, the flexibility of the hose body 2 is deteriorated. As described above, in the second embodiment, when the angle $\theta_2$ is smaller than that of the first embodiment, the auxiliary pressure cord layer 7 is expanded and deformed mainly in the radial direction by the pressure of leaking fluid.

As illustrated in FIGS. 7 and 8, the float 10a is disposed adjacent to the annular float mount 11 integrally formed around the rubber cover layer 8. Also, the float 10a is held onto the hose body 2 when the annular float fixtures 12a, engaged with the two grooves 10b formed in the circumferential direction, are fastened by the bolt 16, fuse washer 13 and nut 14. It is preferable that a plurality of floats 10a are provided, and it is more preferable that the floats 10a are divided into 3 or 4 pieces by an equal angle, because the float mounting work can then be easily executed. In the same manner as the first embodiment, in order to prevent the floats 10 from moving away from the hose body 2 in the case where the fuse washer 13 has been fractured, each float 10a is moored to the hose body 2 by the mooring rope 15 accommodated inside the float mount 11.

In the second embodiment, when the rubber tube layer 4 and the main pressure cord layer 5 of the hose body 2 are damaged and the fluid leaks out, the leaking fluid flows into the chamber 9 and stays there. Then, by the action of the staying fluid, the auxiliary pressure cord layer 7 is pushed. Therefore, the cords c of the cord ply, being inclined with respect to the longitudinal direction of the hose body 2 by the angle $\theta_2$, are moved so that the inclination angle $\theta_2$ can be increased. Accordingly, the auxiliary pressure cord layer 7 is expanded and deformed in the radial direction of the hose body 2, so that the cover rubber layer 8 on the auxiliary pressure cord layer 7 is also expanded when it is pushed by the auxiliary pressure cord layer 7.

Then, the float 10a and the float fixture 12a are also pushed in the radial direction, and a load not less than a predetermined value is applied to the fuse washer 13. The fuse washer 13 is then fractured and the float 10a is separated from the hose body 2 and rises to the surface. Consequently, when the float 10a is discovered, moored to the hose 1, damage to the inner construction of the hose 1, installed in the sea or water, can be easily detected.

In the second embodiment described above, when the fuse washer 13 is fractured, the float 10a is separated, however, instead of the fracture of the fuse washer 13, it is possible to fracture an intermediate portion of the bolt 16 or to fracture the float fixture 12a.

Figure 9:
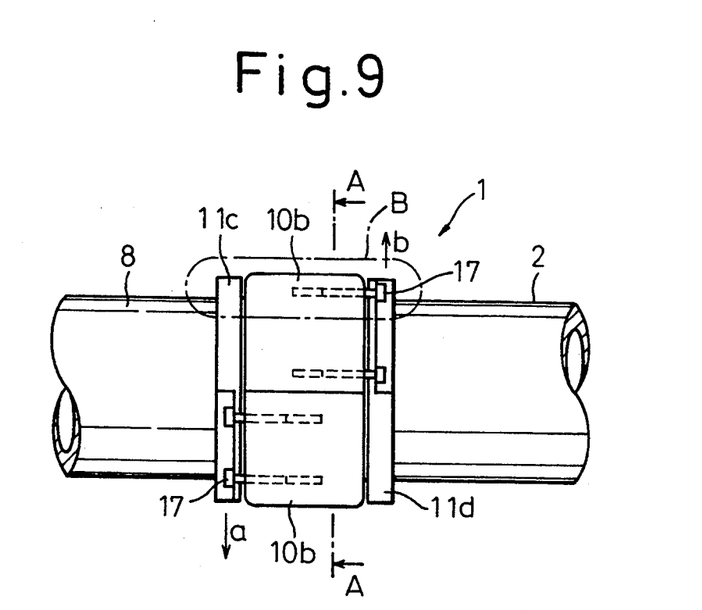
FIG. 9 is a front view showing a portion of the hose of the third embodiment of the present invention.
Figure 10:
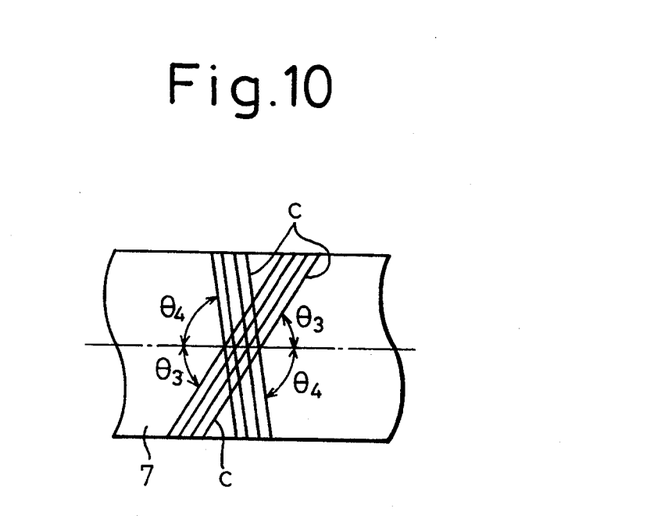
FIG. 10 is a schematic illustration for explaining the orientation of the auxiliary pressure cord layer of the third embodiment shown in FIG. 9.

FIGS. 9, 10, 11A and 11B are views showing the third embodiment of the present invention. Only the points different from those of the first and second embodiments will be explained as follows. In this third embodiment, in the case where the rubber tube layer 4 and the main pressure cord layer 5 are damaged and the fluid flows into the chamber 9, the hose body 2 is twisted. As illustrated in FIG. 10, in the hose body 2 of the third embodiment, the auxiliary pressure cord layer 7 is composed of an asymmetrical cord layer. This asymmetrical cord layer is composed in the following manner:

The cords c in the cord layer are stacked in such a manner that the cords c are crossed to each other. The helix angles $\theta_3$ and $\theta_4$ of the cords c with respect to the longitudinal direction of the hose are different according to the direction of inclination.

A preferable relation between the helix angles $\theta_3$ and $\theta_4$ is expressed as $\theta_3 < \theta_4 < 90°$, and the angle $\theta_4$ preferably expressed as $80° < \theta_4 \leq 90°$. It is preferable that the angle $\theta_3$ is determined to be larger than the helix angle $\theta_1$ (shown in FIG. 3) of the cords f of the main pressure cord layer 5 so that the asymmetrical cord layer is not affected by the pressure of fluid flowing in the hose 1 before the main pressure cord layer 5 is damaged. The angle $\theta_3$ is determined so that it satisfies $\theta_1 < \theta_3 < \theta_1 + 20°$, and preferably it satisfies $\theta_1 < \theta_3 < 60°$. As described above, in the third embodiment, when the helix angle of the cords c is made to be asymmetrical, the auxiliary pressure cord layer 7 is mainly subjected to twisting deformation by the action of pressure of the fluid.

Figure 11A:
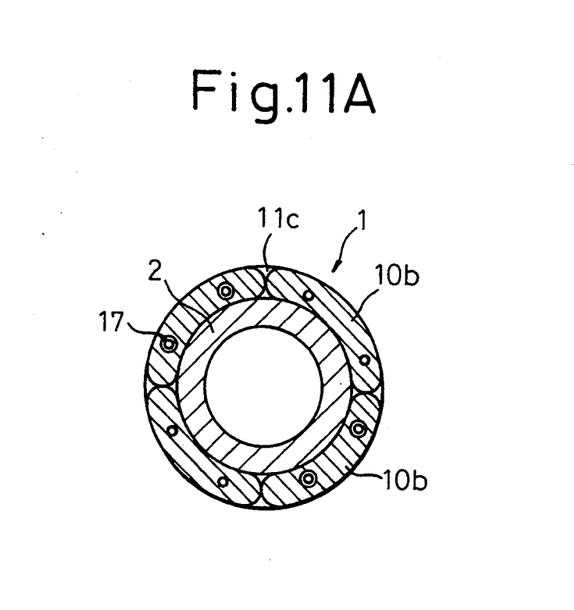
FIG. 11A is a sectional view taken on line A—A in FIG. 9.
Figure 11B:
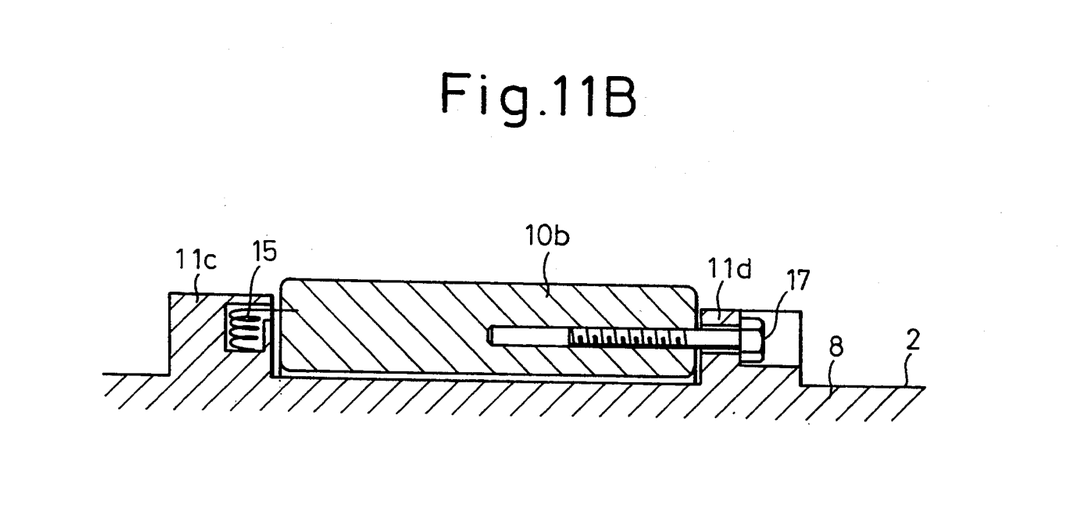
FIG. 11B is an enlarged sectional view of the portion B in FIG. 9.

As illustrated in FIGS. 9, 11A and 11B, the float 10b is provided between a pair of annular float mounts 11c, 11d integrally formed on the outer circumference of the cover layer 8, through fuse bolts 17 which are connecting members. It is preferable that a plurality of floats 10b are provided. It is more preferable that the floats 10b are divided into 3 or 4 pieces by an equal angle. In order to prevent the floats 10b from moving away from the hose body 2 when the fuse bolts 17 have been fractured, each float 10b is moored to the hose body 2 by the mooring rope 15 accommodated inside the float mounts 11a, 11b.

Figure 12:
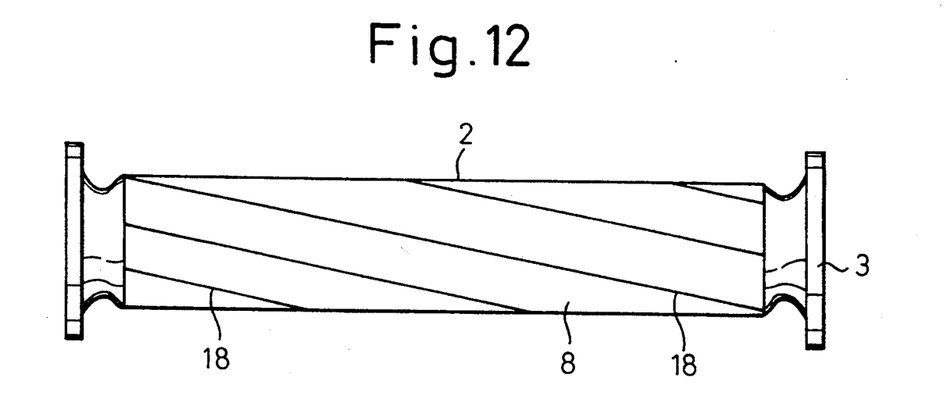
FIG. 12 is a schematic illustration showing a twist of the hose body in FIG. 9.

In this third embodiment, when the rubber tube layer 4 and the main pressure cord layer 5 of the hose body 2 are damaged and the fluid leaks out, the leaking fluid flows into the chamber 9 and stays there. Then, by the action of the fluid, the auxiliary pressure cord layer 7 is pushed. Since the helix angles $\theta_3$ and $\theta_4$ of the cords of the auxiliary pressure cord layer 7 disposed being inclined in the longitudinal direction are different from each other according to the direction of inclination, the hose body 2 is twisted in the longitudinal direction as illustrated in FIG. 12. Lines 18 used for visual recognition which are provided on the hose body 2 in parallel with the longitudinal direction, are twisted as shown in FIG. 12. Accordingly, the float mount 11c is twisted in the direction of arrow a in FIG. 9, and the float mount 11d is twisted in the direction of arrow b in FIG. 9. When a load not less than a predetermined value is impressed upon the fuse bolt 17 due to the twisting motion, the fuse bolt 17 is fractured, and the float 10b is separated from the hose body 2 and raised on the surface. Consequently, when the float 10b is discovered moored to the hose 1, damage to the inner construction of the hose installed in the sea or water can be easily detected.

It is possible to adopt the following construction: In the asymmetrical cord layer of the auxiliary pressure cord layer 7, the helix angles $\theta_3$ and $\theta_4$ are made to be equal, and the cord layers of odd numbers are stacked so that the cords c are crossed to each other. Also, while the number of cord layers having the cords c inclined in one direction is made to be different from the number of cord layers having the cords c inclined in the other direction so that they are crossed, the layers are stacked by an even number.

Also, the following construction may be adopted:

Asymmetrical cord layers of the auxiliary pressure cord layer 7 are stacked so that the cords c are crossed to each other, and the cord layer has the cords c in which the product of the elastic modulus and the sectional area is different. For example, steel cords and nylon cords are used, and the helix angles $\theta_3$ and $\theta_4$ are made to be equal. Due to the foregoing, when the fluid has leaked out from the rubber tube layer 4 and the main pressure cord layer 5, the auxiliary pressure cord layer 7 can be twisted by the pressure of leaking fluid.

Also, the cord layers constructed in the manner described above may be combined, so that an asymmetrical cord layer may be formed. For example, the helix angles $\theta_3$ and $\theta_4$ may be made to be different, and the cords c may be respectively made of steel and nylon cords.

Figure 13:
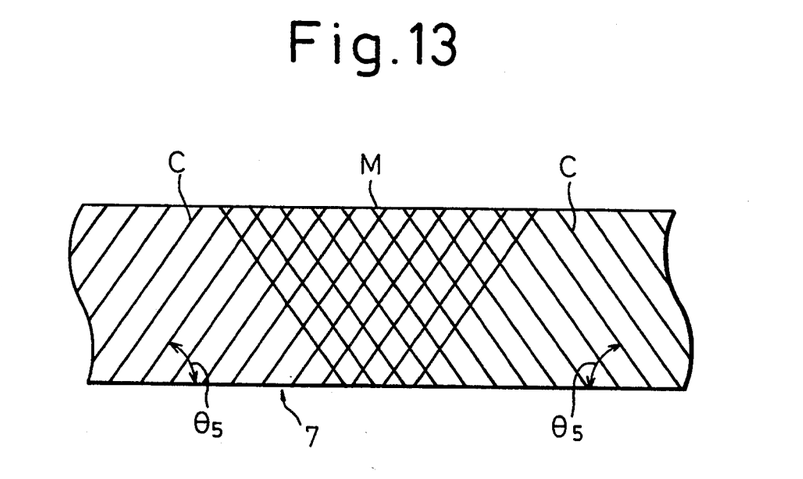
FIG. 13 is a schematic illustration of an asymmetrical cord layer on which a cord arrangement of the cord layer is formed approximately symmetrical with respect to the transverse direction at the center of the hose.
Figure 14:
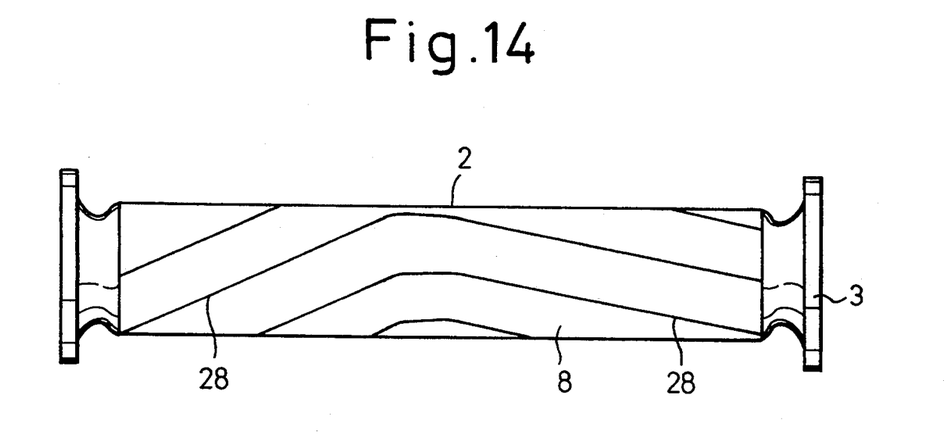
FIG. 14 is a schematic illustration showing a twist of the hose having a cord layer shown in FIG. 13.

Further, an arrangement of the cords c of the cord layer used for the aforementioned asymmetrical cord layer may be made to be symmetrical in the transverse direction at the center of the longitudinal direction of the hose body 2. That is, as illustrated in FIG. 13, the cords c which are inclined from the left to the upper right by the angle $\theta_5$ are changed to an arrangement in which the cords c are inclined from the left to the lower right by the same angle $\theta_5$, at the approximately central portion M. In this way, the arrangement of the cords c is made to be approximately symmetrical in the transverse direction. The above cord layer can be obtained, for example, when the cords c disposed from the left to the upper right and the cords c disposed from the left to the lower right are overlapped and wound at the central portion M while an appropriate width is provided. When the aforementioned cord layers are stacked in the same manner as described above so that asymmetrical cord layers are formed, the twisting directions become opposite to each other at the central portion M. Therefore, as illustrated by the visual recognition lines 28 in FIG. 14, torque generated in twisting can be canceled. Therefore, the twisting torque is not transmitted to other hoses to be connected. Further, the twist of the auxiliary pressure cord layer 7 is not restricted by the objects on both ends to be connected. Accordingly, a good connecting condition, with respect to the objects to be connected, can be maintained and, even when the hose is connected to the objects, the twisting condition can be positively provided.

Embodiments of the present invention are explained above in detail. However, it should be understood that the invention is not intended to be limited to the specific embodiments, and variations may be made without departing from the spirit and scope of the invention. For example, in the above embodiment, the number of layers (the number of plies) of the main pressure cord layer 5 is larger than that of the auxiliary pressure cord layer 7, however, they may be the same.

The present invention is constructed in the manner described above. When the main pressure cord layer is damaged and the transported fluid flows into the chamber and an amount of deformation of the auxiliary pressure cord layer is increased to a predetermined value, the connecting member is fractured and the float is separated from the hose and raised on the surface. When the float is sighted, the hose in which the main pressure cord layer has been damaged can be easily discovered.

Further, auxiliary apparatus such as a detector and a receiver are not required, and the hose can be easily installed, and further the cost can be reduced. Unlike the detector, breakdown and malfunction are not likely to occur in the apparatus of the invention. Accordingly, good reliability can be maintained over a long period of time. Consequently, the present invention is suitable for use as the hose used for loading a tanker with oil or the like, or for unloading the tanker.

We claim:

1. A hose comprising: a main pressure cord layer for retaining a circulating fluid; an auxiliary pressure cord layer sheathing said main pressure cord layer; and a chamber for retaining the fluid leaking from said main pressure cord layer, said chamber being formed between said main pressure cord layer and said auxiliary pressure cord layer, wherein said auxiliary pressure cord layer is capable of being deformed by the pressure of the fluid retained in said chamber, said hose further comprising a float moored at said hose, said float being connected to said hose through a connection member, wherein said connection member is fractured and said float is released from said hose when an amount of deformation of said auxiliary pressure cord layer has increased to a predetermined value.

2. The hose according to claim 1, wherein an annular float mount is integrally attached to said hose, and a plurality of floats divided into pieces in the circumferential direction are disposed adjacent to said annular float mount.

3. The hose according to claim 2, wherein each float is attached to said hose with a mooring rope which is accommodated in said float mount.

4. The hose according to claim 1, wherein said auxiliary pressure cord layer is mainly deformed in the longitudinal direction of said hose by the action of pressure of the fluid retained in said chamber, a pair of float mounts are integrally attached to said hose at an interval in the longitudinal direction, said floats are respectively disposed on said float mounts, said floats are connected by wires penetrating through said float mounts, and said floats are released from said hose when the amount of longitudinal deformation of said auxiliary pressure cord layer has increased to a predetermined value.

5. The hose according to claim 4, wherein said float is connected to said wire through a fuse washer which is fractured when a predetermined stress is applied.

6. The hose according to claim 1, wherein said auxiliary pressure cord layer is mainly expanded and deformed in the radial direction of said hose by the action of pressure retained in said chamber, said float mount is integrally attached to said hose, said float, attached to and disposed adjacent to said float mount, is fastened and fixed to said hose by an annular float fastening fixture, and said float is released from said hose when an amount of expanding deformation in the radial direction of said auxiliary pressure cord layer has increased to a predetermined value.

7. The hose according to claim 6, wherein said annular float fixture is fastened and fixed to said hose through a fuse washer to be fractured by a predetermined stress and also through a bolt and nut.

8. The hose according to claim 1, wherein said auxiliary pressure cord layer is mainly deformed in the twisting direction by the action of pressure of the fluid retained in said chamber, a pair of float mounts are integrally attached to said hose at an interval in the longitudinal direction, said floats are disposed between these float mounts, and said floats are respectively connected to the float mounts through fuse bolts to be fractured by a predetermined stress.

9. The hose according to claim 8, wherein said float is annular and divided into a plurality of pieces in the circumferential direction, and the pieces of said divided float are alternately connected to one and the other of the pair of float mounts by said fuse bolts.

* * * * *